(12) United States Patent
Oonishi

(10) Patent No.: US 12,271,177 B2
(45) Date of Patent: Apr. 8, 2025

(54) NUMERICAL CONTROL DEVICE WITH MANUAL HANDLE CONFIGURED BASED ON CONTROL MODE

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 358 days.

(21) Appl. No.: 17/759,991

(22) PCT Filed: Feb. 15, 2021

(86) PCT No.: PCT/JP2021/005485
§ 371 (c)(1),
(2) Date: Aug. 2, 2022

(87) PCT Pub. No.: WO2021/166841
PCT Pub. Date: Aug. 26, 2021

(65) Prior Publication Data
US 2023/0063168 A1      Mar. 2, 2023

(30) Foreign Application Priority Data

Feb. 20, 2020   (JP) ................................ 2020-027521

(51) Int. Cl.
*G05B 19/409*        (2006.01)
(52) U.S. Cl.
CPC ................................ *G05B 19/409* (2013.01)
(58) Field of Classification Search
None
See application file for complete search history.

(56) References Cited

U.S. PATENT DOCUMENTS

| 7,774,088 B2 * | 8/2010 | Yamada | G05B 19/409 700/20 |
| 2005/0154489 A1 | 7/2005 | Sone et al. | |

(Continued)

FOREIGN PATENT DOCUMENTS

| JP | H06-190691 A | 7/1994 |
| JP | H08-057735 A | 3/1996 |

(Continued)

OTHER PUBLICATIONS

International Search Report issued in PCT/JP2021/005485; mailed Apr. 20, 2021.

(Continued)

*Primary Examiner* — Bernard G Lindsay
(74) *Attorney, Agent, or Firm* — Studebaker Brackett PLLC

(57) ABSTRACT

Provided is a numerical control device which can improve the operability of a machine tool. The numerical control device controls a machine tool having a manual handle for moving a shaft by manual operation. The numerical control device comprises: a control mode determination unit for determining a control mode of the machine tool; a haptic control unit for generating haptic feedback at the manual handle on the basis of the control mode determined by the control mode determination unit; and a manual handle control unit for performing, by rotating operation of the manual handle where the haptic feedback is generated, control of the machine tool by the numerical control device.

2 Claims, 4 Drawing Sheets

MANUAL HANDLE MODE

JOG MODE

(56) References Cited

U.S. PATENT DOCUMENTS

| | | | |
|---|---|---|---|
| 2009/0295739 A1 | 12/2009 | Nagara | |
| 2010/0305758 A1* | 12/2010 | Nishi | G05B 19/409 |
| | | | 318/568.14 |
| 2013/0311950 A1 | 11/2013 | Kim | |
| 2014/0067128 A1* | 3/2014 | Kowalski | G05B 19/409 |
| | | | 700/264 |
| 2014/0277614 A1 | 9/2014 | Larimer | |
| 2015/0133034 A1* | 5/2015 | Luthi | B24B 41/005 |
| | | | 451/178 |
| 2016/0091889 A1 | 3/2016 | Nakajima et al. | |
| 2016/0299492 A1 | 10/2016 | Qi | |
| 2017/0185079 A1* | 6/2017 | Shimizu | G05B 19/4068 |
| 2017/0371316 A1 | 12/2017 | Kimura et al. | |
| 2019/0101891 A1 | 4/2019 | Iijima et al. | |
| 2023/0063168 A1 | 3/2023 | Oonishi | |

FOREIGN PATENT DOCUMENTS

| | | |
|---|---|---|
| JP | 2002-196883 A | 7/2002 |
| JP | 2002-239871 A | 8/2002 |
| JP | 2010-277425 A | 12/2010 |
| JP | 2014-050950 A | 3/2014 |
| JP | 2016-175132 A | 10/2016 |
| JP | 2017-117278 A | 6/2017 |
| WO | 2006/051581 A1 | 5/2006 |
| WO | 2017/195259 A1 | 11/2017 |

OTHER PUBLICATIONS

International Search Report mailed Apr. 20, 2021 in the International Patent Application No. PCT/JP2021/005488.

An Office Action mailed by the United States Patent and Trademark Office on Oct. 8, 2024, which corresponds to U.S. Appl. No. 17/759,984 and is related to U.S. Appl. No. 17/759,991.

* cited by examiner

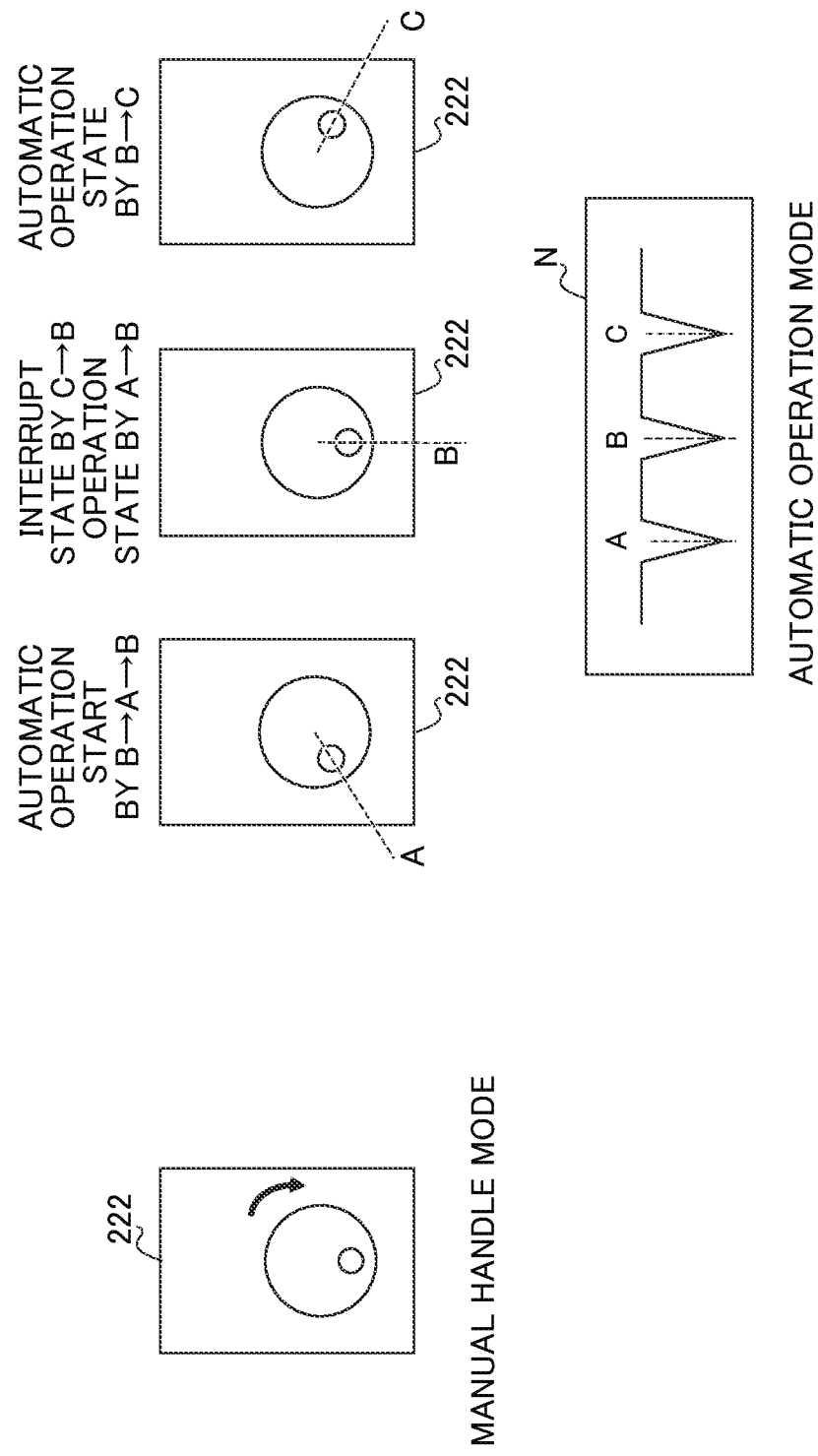

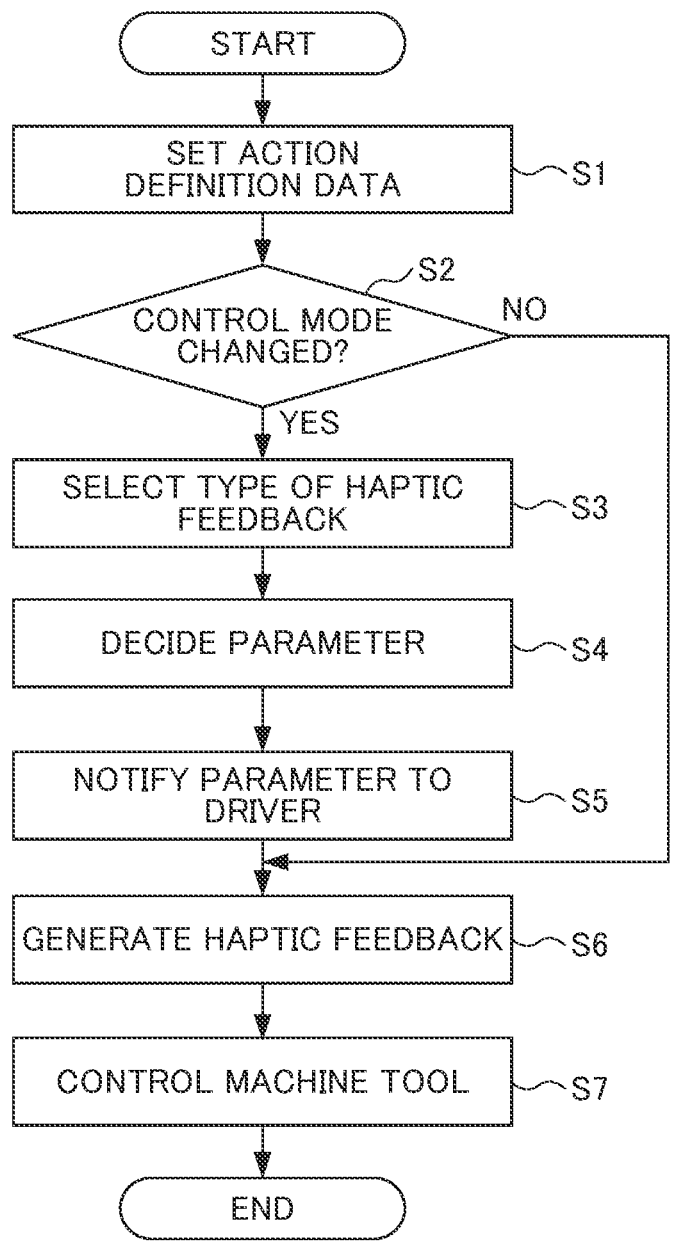

NUMERICAL CONTROL DEVICE WITH MANUAL HANDLE CONFIGURED BASED ON CONTROL MODE

TECHNICAL FIELD

The present invention relates to a numerical control device.

BACKGROUND ART

Conventionally, technology for generating sound and vibrations according to load has been known in machine tools which perform axis feed by a manual handle (for example, refer to Patent Document 1). Patent Document 1 discloses a machine tool which includes a control means that varies the type of sound and vibration of a communicating means according to the magnitude of a detected load by a load detecting means.

Patent Document 1: Japanese Unexamined Patent Application, Publication No. H06-190691

DISCLOSURE OF THE INVENTION

Problems to be Solved by the Invention

Such a manual handle only has a function of notifying a pulse according to the rotation amount of the handle to the numerical control device. For this reason, the manual handle is not used in operations other than manual handle mode, and operations other than a manual handle mode are performed by buttons, etc. of a machine control panel. Therefore, it has been necessary to switch operational objects between operation using the manual handle and operation using the machine control panel. In addition, it has been necessary for the machine control panel to provide buttons, switches, etc. as required. Therefore, a numerical control device which can improve the operability of a machine tool has been desired.

Means for Solving the Problems

A numerical control device according to the present disclosure controls a machine tool having a manual handle that moves an axis by manual operation, the numerical control device including: a control mode determination section which determines a control mode of the machine tool; a haptic control section which causes haptic feedback to be generated in the manual handle based on the control mode determined by the control mode determination section; and a manual handle control section which performs control of the machine tool by the numerical control device according to a rotation operation of the manual handle in which the haptic feedback is generated.

Effects of the Invention

According to the present invention, it is possible to improve the operability of a machine tool.

BRIEF DESCRIPTION OF THE DRAWINGS

FIG. 3 is a view showing an example in the case of the control mode being an automatic operation mode; and FIG. 4 is a flowchart showing the flow of processing of the numerical control device.

PREFERRED MODE FOR CARRYING OUT THE INVENTION

Figure 1:
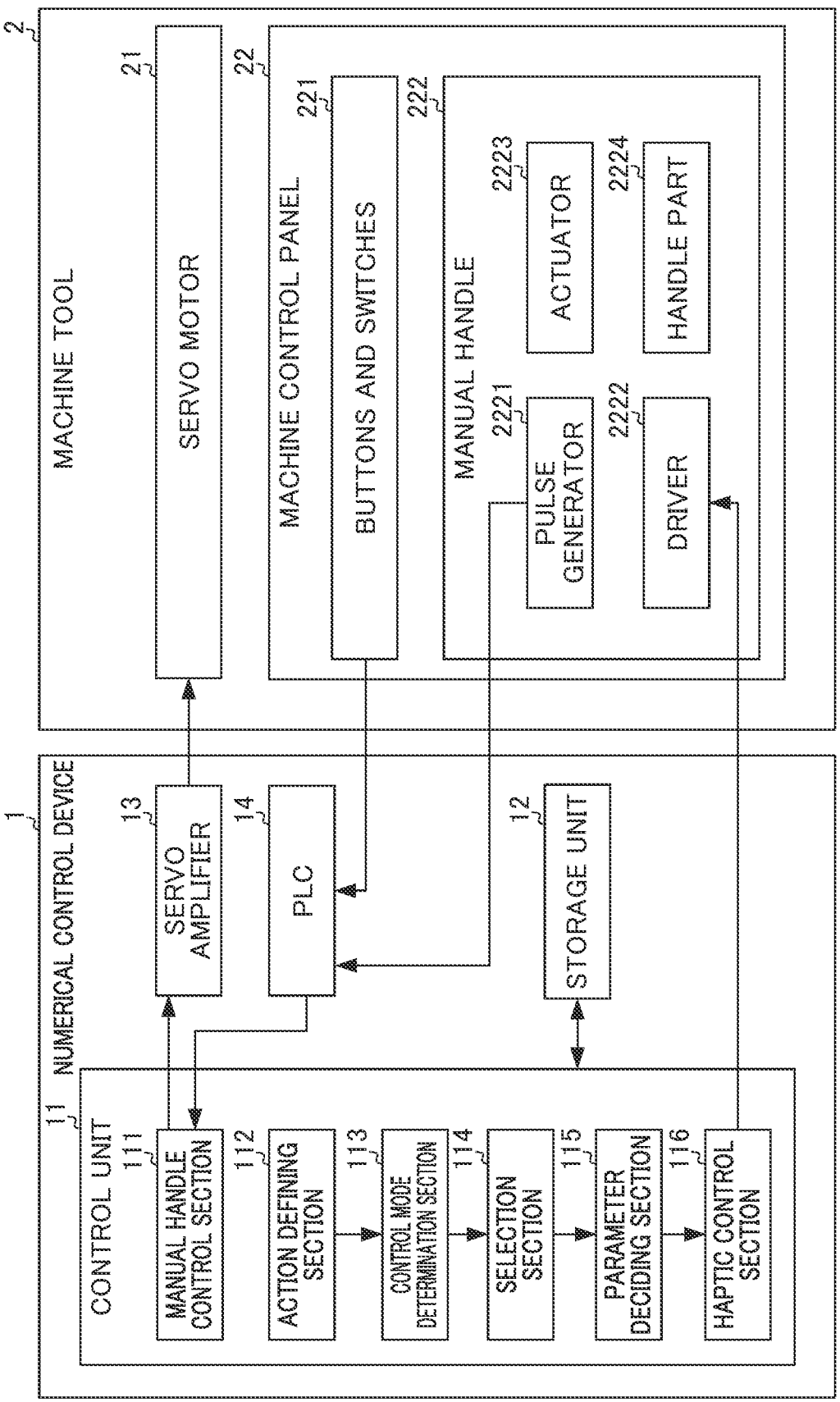
FIG. 1 is a view showing the configurations of a numerical control device and a machine tool according to the present embodiment.

Hereinafter, an example of an embodiment of the present invention will be explained. FIG. 1 is a view showing configurations of a numerical control device 1 and a machine tool 2. The numerical control device 1 and machine tool 2 are connected by a bus (not shown) or the like, and the machine tool 2 operates in accordance with control of the numerical control device 1.

As shown in FIG. 1, the numerical control device 1 includes a control unit 11, a storage unit 12, a servo amplifier 13, and a PLC (Programmable Logic Controller) 14.

The control unit 11 is a processor such as a CPU (Central Processing Unit), and functions as a manual handle control section 111, action defining section 112, control mode determination section 113, selection section 114, parameter deciding section 115, and haptic control section 116, by executing programs stored in the storage unit 12.

The storage unit 12 is configured by ROM (read only memory), RAM (random access memory), non-volatile memory, hard disk drive, etc., and stores various data. For example, the storage unit 12 stores action definition data, parameters, etc. described later.

The servo amplifier 13 amplifies movement commands of axes received from the control unit 11, and drives the servo motor 21 of the machine tool 2. The PLC 14 receives M (auxiliary) function signals, S (spindle speed control) function signals, T (tool selection) function signals, etc. from the control unit 11. Then, the PLC 14 processes these signals by sequence programs, and outputs the processed output signals to the machine tool 2. The PLC 14 controls pneumatic equipment, hydraulic equipment, electromagnetic actuators, etc. in the machine tool 2 according to the output signals.

In addition, the PLC 14 receives various signals such as button signals, switch signals, and manual handle signals of the machine control panel 22 of the machine tool 2, and sequences the various signals received. Then, the PLC 14 sends the various signals thus sequenced to the control unit 11 via the bus.

The machine tool 2 includes the servo motor 21 and machine control panel 22. It should be noted that, in the present disclosure, other configurations of the machine tool 2 are omitted for simplification of explanation, and the machine tool 2 has the configuration of a general machine tool.

The servo motor 21 drives an axis according to the movement command of the axis received from the servo amplifier 13. The machine control panel 22 includes buttons and switches 221, and the manual handle 222. The buttons and switches 221 include mechanical buttons and switches. The buttons and switches 221 output button signals and switch signals to the PLC 14, when the mechanical buttons or switches are pressed.

The manual handle 222 moves one or a plurality of axes according to manual operation. The manual handle 222 includes a pulse generator 2221, driver 2222, actuator 2223 and handle part 2224.

The pulse generator 2221, when causing the handle unit 2224 to rotate in the + direction or − direction, outputs a pulse signal according to this rotation. This pulse signal is a two-phase pulse for determining the rotation direction, and is sent to the control unit 11 via the bus. Then, the manual handle control section 111 of the control unit 11 sends the movement command of an axis of the machine tool 2 to the servo amplifier 13 based on this pulse signal.

The driver 2222 receives control signals from the haptic control section 116 of the control unit 11, and outputs a drive signal for generating haptic feedback to the actuator 2223.

The actuator 2223 is driven by the drive signal from the driver 2222, and generates a haptic feedback. The actuator 2223, for example, may be an electric motor, an electromagnetic actuator, a shape-memory alloy, an electroactive polymer, a solenoid, an eccentric motor, a linear resonance actuator, a piezoelectric actuator or the like. In addition, the actuator 2223 may be configured by a plurality of different actuators.

The handle part 2224 is configured by a mechanical manual handle, for example, and is operated by an operator.

The manual handle control section 111 performs control of a machine tool by the numerical control device 1 according to a rotational operation of the manual handle 222 for which haptic feedback is generated, based on the control mode determined by the control mode determination section 113.

More specifically, the manual handle control section 111 receives a pulse signal outputted from the pulse generator 2221 according to the rotation operation of the manual handle 222. Then, the manual handle control section 111 sends a movement command of an axis of the machine tool 2 to the servo amplifier 13 based on the control mode and pulse signal. The numerical control device 1 can thereby perform control of the machine tool by the numerical control device 1 according to the rotation operation of the manual handle 222 without using manual buttons, etc. of the machine tool 2.

The operation defining section 112 sets action definition data defining the haptic feedback generated in the manual handle 222.

The action definition data, for example, associates the control mode of the machine tool 2, action of the machine tool 2, and kind of haptic feedback. The action definition data is stored in the storage unit 12. Herein, the control mode of the machine tool 2, for example, includes a manual handle mode, jog feed mode, incremental mode and automatic operation mode. It should be noted that the control mode of the machine tool 2 is set by operation of the machine control panel 22.

The manual handle mode is conventionally a mode enabling to move an axis by turning the manual handle 222 manually by an operation. The jog feed mode is a mode enabling to move an axis in the − (minus) direction and + (plus) direction, when turning the manual handle 222 to a specific position. The incremental mode is a mode enabling to move an axis by a predetermined movement amount from the current position or movement position, when turning the manual handle 222 to a specific position. The automatic operation mode is a mode enabling to automatically operate a program when turning the manual handle 222 to a specific position.

The numerical control device 1 according to the present embodiment realizes these control modes by haptic feedback in the manual handle 222.

Actions of the machine tool 2 includes, for example, moving an axis in the − (minus) direction, moving an axis in the + (plus) direction, moving an axis by a predetermined movement amount, and automatically operating a program. The type of haptic feedback includes, for example, detent-like resistance tactile sense, vibration tactile sense, etc.

The control mode determination section 113 determines the control mode of the machine tool 2. More specifically, the control mode determination section 113 determines whether the control mode of the machine tool 2 is changed from a previous control mode.

The selection section 114 selects the type of haptic feedback based on the action definition data and control mode. For example, the selection section 114, in the case of the control mode being the jog mode, selects the detent-like resistance tactile sense associated with the control mode in the action definition data, as the type of haptic feedback.

The parameter deciding section 115 decides parameters related to haptic feedback, based on the type of haptic feedback selected by the selection section 114. Herein, the type of haptic feedback is associated with parameters related to the haptic feedback. The type of haptic feedback and the parameters related to haptic feedback are stored in the storage unit 12.

The parameters related to haptic feedback include the magnitude, direction, frequency, duration, amplitude, intensity, density, etc. of the haptic feedback.

The haptic control section 116 causes haptic feedback to be generated in the manual handle 222, based on the control mode determined by the control mode determination section 113. More specifically, the haptic control section generates a control signal using parameters decided by the parameter deciding section 115, based on the control mode, and notifies the control signal to the driver 2222. The haptic control section 116 thereby causes haptic feedback to be generated in the manual handle 222.

Figure 2:
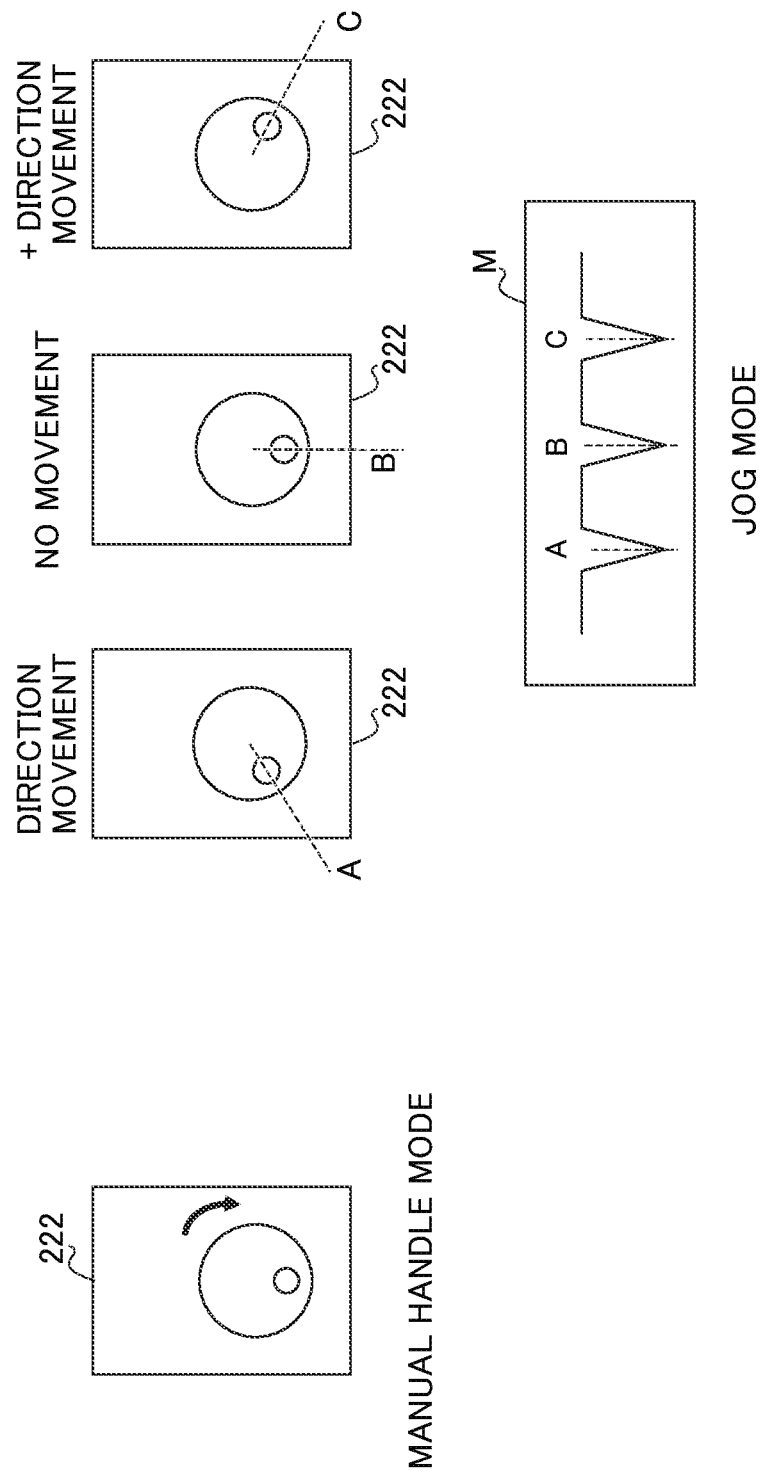
FIG. 2 is a view showing an example in the case of the control mode being a jog mode.

FIG. 2 is a view showing an example in a case of the control mode being the jog mode. As shown in FIG. 2, in the manual handle mode, the manual handle 222 can move an axis by turning the manual handle 222 manually without generating haptic feedback.

In addition, in the jog mode, the haptic control section 116 generates detent-like resistance tactile sense at position A, position B and position C of the manual handle 222 by haptic feedback. For example, as shown in the exemplary control signal M in FIG. 2, the haptic control section 116 generates haptic feedback such that the resistance tactile sense decreases at position A, position B and position C. In addition, the haptic control section 116 generates haptic feedback so that the resistance tactile sense becomes greater at positions other than position A, position B and position C than at position A, position B and position C.

Then, the manual handle control section 111 controls an axis so as to move the axis in the − (minus) direction, when turning the manual handle 222 to position A. In addition, the manual handle control section 111 controls an axis so as not to move the axis, when turning the manual handle 222 to position B. In addition, the manual handle control section 111 controls an axis so as to move the axis in the + (plus) direction at position C.

In this way, by performing control of the machine tool by the numerical control device 1 according to a rotation operation of the manual handle 222 in which haptic feedback is generated, it is possible to realize the jog mode without requiring a button or the like.

FIG. 3 is a view showing an example in the case of the control mode being the automatic operation mode. As shown in FIG. 3, when the control mode is changed from the manual handle mode to the automatic operation mode, the haptic control section 116 generates the detent-like resistance tactile sense at position A, position B and position C of the manual handle 222 by way of haptic feedback.

For example, as shown in the exemplary control signal N of FIG. 3, the haptic control section 116 generates haptic feedback so that the resistance haptic sense at position A, position B and position C decreases. In addition, the haptic control section 116 generates haptic feedback so that the resistance tactile sense becomes greater at positions other than position A, position B and position C than position A, position B and position C.

The manual handle control section 111 starts automatic operation when the manual handle 222 is set to position B→position A→position B. The manual handle control section 111 maintains automatic operation when the manual handle 222 is set to position A→position B. In addition, the manual handle control section 111 interrupts automatic operation when the manual handle 222 is set to position B→position C. The manual handle control section 111 maintains interruption of automatic control, when the manual handle 222 is set to position C→position B.

In this way, it is possible to realize the automatic operation mode without requiring buttons or the like, by performing control of the machine tool by the numerical control device 1 according to a rotation operation of the manual handle 222 in which haptic feedback is generated.

It should be noted that, in the aforementioned embodiment, the haptic control section 116 generates haptic feedback so that the resistance tactile sense decreases at a specific position of the manual handle 222; however, haptic feedback may be generated so that resistance tactile sense increases at a specific position. In addition, the haptic control section 116 may generate other modes of haptic feedback whereby a user can identify specific positions of the manual handle 222, instead of the aforementioned modes of haptic feedback.

FIG. 4 is a flowchart showing the flow of processing of the numerical control device 1. In Step S1, the action defining section 112 sets the action definition data defining the haptic feedback generated in the manual handle 222. In Step S2, the control mode determination section 113 determines whether the control mode of the machine tool 2 is changed from the previous control mode. In the case of the control mode being changed (YES), the processing advances to Step S3. In the case of the control mode not being changed (NO), the processing advances to Step S6.

In Step S3, the selection section 114 selects the type of haptic feedback based on the action definition data and control mode. In Step S4, the parameter deciding section 115 decides parameters related to haptic feedback based on the type of haptic feedback selected by the selection section 114.

In Step S5, the haptic control section 116 generates a control signal using the parameters decided by the parameter deciding section 115, and notifies the control signal to the driver 2222. In Step S6, the driver 2222 receives a control signal from the haptic control section 116 of the control unit 11, and outputs a drive signal for generating haptic feedback to the actuator 2223. Then, the actuator 2223 is driven by a drive signal from the driver 2222, and generates haptic feedback.

In Step S7, the manual handle control section 111 performs control of the machine tool by the numerical control device 1 according to a rotation operation of the manual handle in which haptic feedback is generated as a resistance sensation.

As explained above, according to the present embodiment, the numerical control device 1 for controlling the machine tool 2 having the manual handle 222 moving an axis by manual operation includes: the control mode determination section 113 which determines the control mode of the machine tool 2, the haptic control section 116 which causes haptic feedback to be generated in the manual handle based on the control mode, and the manual handle control section 111 which performs control of the machine tool 2 by the numerical control device 1 according to a rotation operation of the manual handle in which haptic feedback is generated.

The numerical control device 1 can thereby realize actions according to the control mode, without requiring buttons or the like, by performing control of the machine tool by the numerical control device 1 according to a rotation operation of the manual handle 222 in which haptic feedback is generated as a resistance sensation. Therefore, the numerical control device 1 can improve the operability of the machine tool 2, without requiring conventional buttons, etc.

In addition, the numerical control device 1 further includes: the action defining section 112 which sets the action definition data defining the haptic feedback generated in the manual handle 222; the selection section 114 which selects the type of haptic feedback based on the action definition data and control mode, and the parameter deciding section 115 which decides parameters related to haptic feedback based on the type of haptic feedback selected by the selection section 114. The haptic control section 116 causes haptic feedback to be generated in the manual handle 222 using the parameters. The numerical control device 1 can thereby cause haptic feedback to be appropriately generated in the manual handle 222.

In addition, the control mode includes the manual handle mode, jog feed mode, incremental mode and automatic operation mode. The numerical control device 1 can thereby realize operation by a plurality of control modes, and improve operability of the machine tool 2.

Although an embodiment of the present invention has been explained above, the present invention is not to be limited to the aforementioned embodiment. In addition, the effects described in the present embodiment are merely listing the most preferred effects produced from the present invention, and the effects from the present invention are not to be limited to those described in the present embodiment.

EXPLANATION OF REFERENCE NUMERALS 1 numerical control device
2 machine tool
11 control unit
12 storage unit
13 servo amplifier
14 PLC
21 servo motor
22 machine control panel
111 manual handle control section
112 action defining section
113 control mode determination section
114 selection section
115 parameter deciding section
116 haptic control section
221 buttons and switches
222 manual handle
2221 pulse generator
2222 driver
2223 actuator
2224 handle part

The invention claimed is:

1. A numerical control device for controlling a machine tool having a manual handle that moves an axis by manual operation, the numerical control device comprising:

a processor,
wherein the processor is configured to
determine a control mode of the machine tool;
cause haptic feedback to be generated in the manual handle based on the determined control mode;
perform control of the machine tool by the numerical control device according to a rotation operation of the manual handle in which the haptic feedback is generated;
set action definition data that defines the haptic feedback to be generated in the manual handle;
select a type of the haptic feedback based on the action definition data and the control mode; and
decide a parameter related to the haptic feedback based on the type of the haptic feedback,
wherein the selected type of the haptic feedback is resistance tactile sense, and the processor generates the haptic feedback using the parameter so that at least one of:
the resistance tactile sense decreases at one or more specific detent positions of the manual handle relative to other positions of the manual handle, or
the resistance tactile sense increases at one or more specific non-detent positions of the manual handle relative to other positions of the manual handle.

2. The numerical control device according to claim 1, wherein the control mode includes a manual handle mode, a jog feed mode, an incremental mode and an automatic operation mode.

* * * * *